(12) United States Patent
Takikawa et al.

(10) Patent No.: US 7,009,814 B2
(45) Date of Patent: Mar. 7, 2006

(54) DISC DRIVE SUSPENSION IN WHICH TRACK-DIRECTION SWING IN THE LOW-FREQUENCY BAND IS RESTRAINED

(75) Inventors: Kenichi Takikawa, Aikou-gun (JP); Masao Hanya, Yokohama (JP); Noriyuki Saito, Sagamihara (JP)

(73) Assignee: NHK Spring Co., Ltd., Yokohama (JP)

(*) Notice: Subject to any disclaimer, the term of this patent is extended or adjusted under 35 U.S.C. 154(b) by 197 days.

(21) Appl. No.: 10/650,060

(22) Filed: Aug. 27, 2003

(65) Prior Publication Data

US 2004/0179303 A1    Sep. 16, 2004

(30) Foreign Application Priority Data

Aug. 30, 2002   (JP) ............................. 2002-255751

(51) Int. Cl.
*G11B 5/48* (2006.01)
(52) U.S. Cl. .................... 360/245.9; 360/264.2
(58) Field of Classification Search ............ 360/245.9, 360/245.8, 264.2, 244.2, 244.5, 244.8
See application file for complete search history.

(56) References Cited

U.S. PATENT DOCUMENTS

| 5,864,446 | A | * | 1/1999 | Endo et al. ............... 360/244.6 |
| 5,883,758 | A | * | 3/1999 | Bennin et al. ........... 360/245.9 |
| 5,978,177 | A |   | 11/1999 | Takasugi ................. 360/245.9 |
| 6,014,290 | A | * | 1/2000 | Supramaniam et al. .. 360/245.9 |
| 6,144,530 | A |   | 11/2000 | Shiraishi et al. ......... 360/244.1 |
| 6,181,526 | B1 |   | 1/2001 | Summers ................. 360/245.9 |
| 6,360,427 | B1 | * | 3/2002 | Takasugi ................. 29/603.06 |
| 6,571,455 | B1 | * | 6/2003 | Takagi et al. ............ 29/603.03 |
| 6,700,747 | B1 | * | 3/2004 | Matz ....................... 360/245.9 |
| 6,700,748 | B1 | * | 3/2004 | Cowles et al. ........... 360/245.9 |
| 6,704,157 | B1 | * | 3/2004 | Himes et al. ................. 360/75 |
| 6,728,073 | B1 | * | 4/2004 | Budde et al. ............ 360/245.9 |
| 6,741,426 | B1 | * | 5/2004 | Girard ..................... 360/245.4 |
| 6,807,029 | B1 | * | 10/2004 | Someya ................... 360/245.9 |
| 6,847,505 | B1 | * | 1/2005 | Luo ........................ 360/245.8 |

* cited by examiner

*Primary Examiner*—Jefferson Evans
(74) *Attorney, Agent, or Firm*—Frishauf, Holtz, Goodman & Chick, P.C.

(57) ABSTRACT

A disc drive suspension comprises a load beam, baseplate, hinge member, and wired flexure. The wired flexure has a metal base and a wiring portion formed on the metal base. A supported portion is formed on a part of the metal base of the flexure. The supported portion protrudes sideways from the wired flexure, and is fixed to the rear end portion of the baseplate.

14 Claims, 9 Drawing Sheets

DISC DRIVE SUSPENSION IN WHICH TRACK-DIRECTION SWING IN THE LOW-FREQUENCY BAND IS RESTRAINED

CROSS-REFERENCE TO RELATED APPLICATIONS

This application is based upon and claims the benefit of priority from the prior Japanese Patent Application No. 2002-255751, filed Aug. 30, 2002, the entire contents of which are incorporated herein by reference.

BACKGROUND OF THE INVENTION

1. Field of the Invention

The present invention relates to a disc drive suspension incorporated in an information processor, such as a personal computer.

2. Description of the Related Art

A hard disc drive (HDD) that is used to record in or retrieve information from a rotating magnetic disc or magneto-optical disc has a carriage that can turn around a shaft. The carriage is turned around the shaft by means of a positioning motor. The carriage comprises an actuator arm, a suspension provided on the distal end portion of the arm, a head section including a slider mounted on the suspension, etc.

When the disc rotates, the slider on the distal end portion of the suspension slightly lifts above the surface of the disc, and an air bearing is formed between the disc and the slider. The suspension comprises a baseplate, load beam, flexure, wiring member, etc.

A conventional disc drive suspension 1 shown in FIG. 11, for example, has a hinge portion 4 that can bend in its thickness direction between a load beam 2 and a baseplate 3. A wiring member 5 is located outside the hinge portion 4 so as to extend along it. The load beam 2 has a proximal portion 2*a*, on which the baseplate 3 is placed, and a beam body 2*b* that extends from the hinge portion 4 toward a head section 6. A wiring supporting portion 7 is formed on the proximal portion 2*a* of the load beam 2.

FIG. 12 shows the oscillation characteristic of the head section 6 of the suspension 1 in the track direction (indicated by arrow Y in FIG. 11). An oscillation B1 in a primary bending mode appears near the frequency point of 3 kHz. An oscillation T1 in a primary twist mode appears near 9 kHz. Further, an oscillation Sway in a sway mode appears near 16 kHz.

In the suspension 1 having the wiring member 5 that passes outside the hinge portion 4, as in the prior art example described above, the configuration near the hinge portion 4 is asymmetric. Thus, a relatively great oscillation B1 in the primary bending mode appears in the low-frequency band. In an actual disc drive, the oscillation in the low-frequency band is easily amplified by a servomechanism that drives the suspension 1, thus arousing the problem of off-track operation.

In a conventional suspension 1' shown in FIG. 13, on the other hand, a wiring member 5 passes inside a hinge portion 4. The wiring member 5 is fixed to a wiring supporting portion 8 that protrudes sideways from a baseplate 3. That part of the suspension 1' which is situated near the hinge portion 4 is bisymmetrical.

FIG. 14 shows the oscillation characteristic of the suspension 1' in the track direction. Since that part of the suspension 1' near the hinge portion 4 is bisymmetrical, the oscillation B1 in the primary bending mode is improved considerably. However, the oscillation B1 in the primary bending mode slightly appears in the low-frequency band of 3 to 4 kHz. Thus, there is room for improvement with respect to the problem of off-track operation.

Full line M1 in FIG. 15 represents the swing of the wiring supporting portion 8 of the suspension 1' in the thickness direction (indicated by arrow Z in FIG. 13). Broken line M2 in FIG. 15 represents the swing of the distal end portion of a load beam 2 in the thickness direction. In this prior art example, the wiring supporting portion 8 having a relatively great mass laterally projects long from the suspension 1'. As the wiring supporting portion 8 of this example swings in the Z-direction, therefore, torsion is induced, so that the track-direction swing is enhanced in the low-frequency band.

BRIEF SUMMARY OF THE INVENTION

Accordingly, the object of the present invention is to provide a disc drive suspension of which the track-direction swing in the low-frequency band, in particular, can be restrained.

According to a first aspect of the invention, there is provided a disc drive suspension, which comprises a base section including a baseplate, a load beam having a proximal portion and a tip portion, a flexure lapped and fixed on the load beam and having a head section on the distal end portion thereof, and a wiring member located extending along the base section. The base section has a shape such that the weight is balanced bilaterally with respect to the axis of load beam. A part of the wiring member is formed having a supported portion protruding sideways from the wiring member. The supported portion being fixed to the base section. According to this arrangement, the swing of the disc drive suspension in the track direction can be restrained.

Preferably, the base section is bisymmetrical with respect to the axis of the load beam.

According to a second aspect of the invention, the wiring member includes a metal base formed of a metal plate and a wiring portion formed on the metal base. A part of the metal base is formed having a supported portion protruding toward the base section. A part of the wiring member is located beside the base section. The supported portion is fixed to the base section. If the supported portion is fixed to the rear end portion of the baseplate, the track-direction swing can be restrained more effectively.

Preferably, the wiring member is a wired flexure having a metal base and the wiring portion formed on the metal base, and the supported portion is formed on a part of the metal base. According to this arrangement, the track-direction swing of the disc drive suspension having the wired flexure can be restrained.

In the present invention, an adhesive agent may be provided in at least a part of the gap between the respective flanks of the wiring member and the base section. According to this arrangement, the adhesive agent that is supplied between the respective flanks of the wiring member and the baseplate can serve further to restrain the track-direction swing.

Preferably, the disc drive suspension further comprises a hinge member formed independently of the baseplate and the load beam. The hinge member connects the baseplate and the load beam and has a pair of hinge portions capable of springy deformation in the thickness direction between the baseplate and the load beam. The wiring member passes through the hinge portions. According to this arrangement, the track-direction swing of the disc drive suspension in which the baseplate and the load beam are connected by means of the hinge member can be restrained.

If the hinge member is fixed to the baseplate, the supported portion should be made thinner than the hinge member and fixed to that end portion of the baseplate which is not overlapped by the hinge member. According to this arrangement, the supported portion is lower in height level than the hinge member around a boss portion when the hinge member and the supported portion are lapped on the baseplate. Thus, a jig that is used in spreading the boss portion can be prevented from interfering with the supported portion.

Preferably, the load beam has a pair of hinge portions formed on a part thereof and capable of springy deformation in the thickness direction, the wiring member passing through the hinge portions. According to this arrangement, the track-direction swing of the disc drive suspension in which the hinge portions are formed on a part of the load beam can be restrained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 5.

Figure 3:
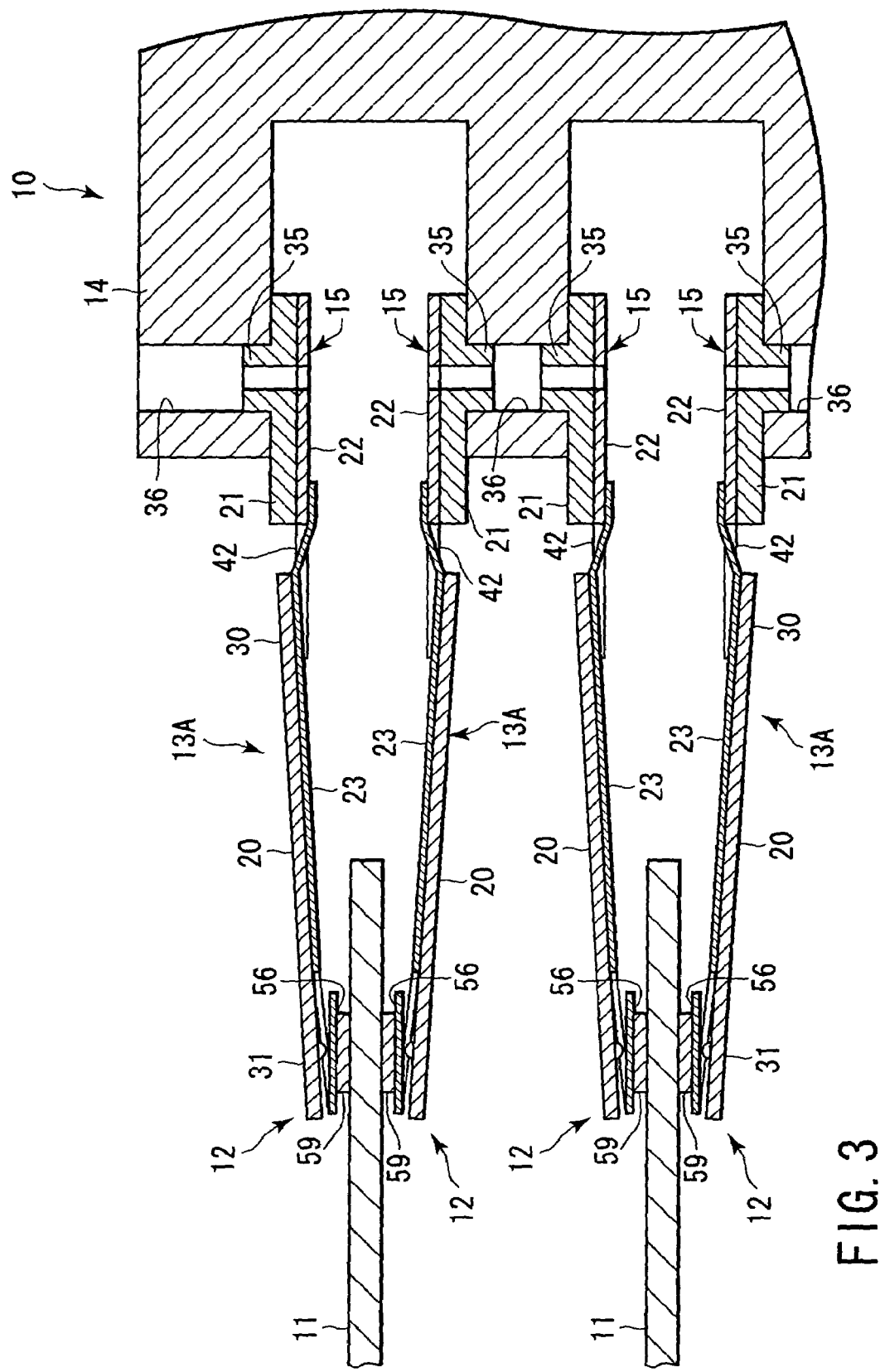
FIG. 3 is a sectional view of a part of a disc drive provided with the suspension shown in FIG. 1.

A hard disc drive (HDD) 10 shown in FIG. 3 comprises a plurality of discs 11 for use as recording media, a plurality of disc drive suspensions 13A, arms (actuator arms) 14, etc. Each suspension 13A has a head section 12 for magnetically recording in and retrieving information from the recording surface of each disc 11. The suspensions 13A are mounted on the arms 14, individually. The arms 14 are turned around a shaft (not shown) by means of a positioning motor (not shown).

Figure 1:
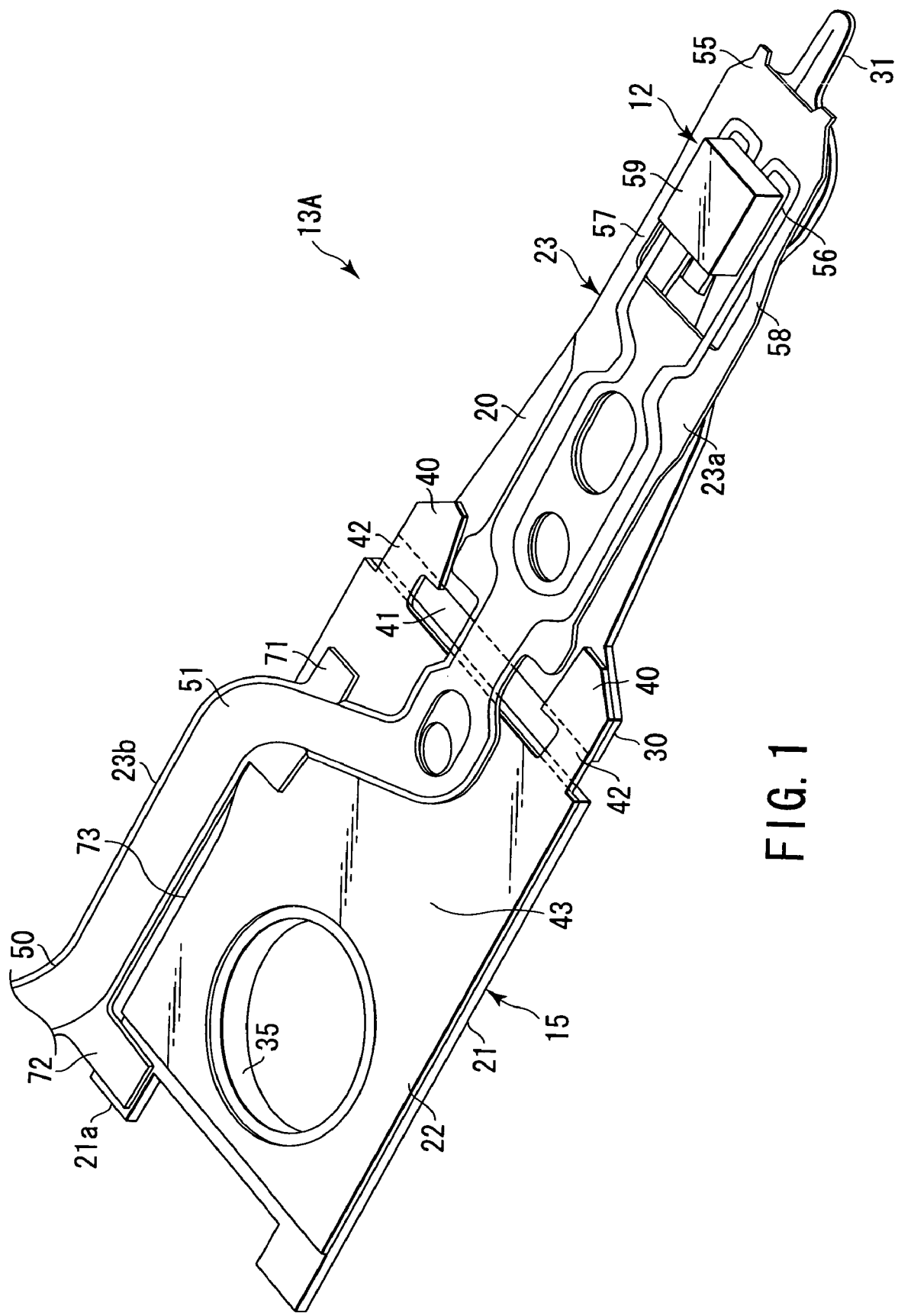
FIG. 1 is a perspective view of a disc drive suspension according to a first embodiment of the invention.
Figure 2:
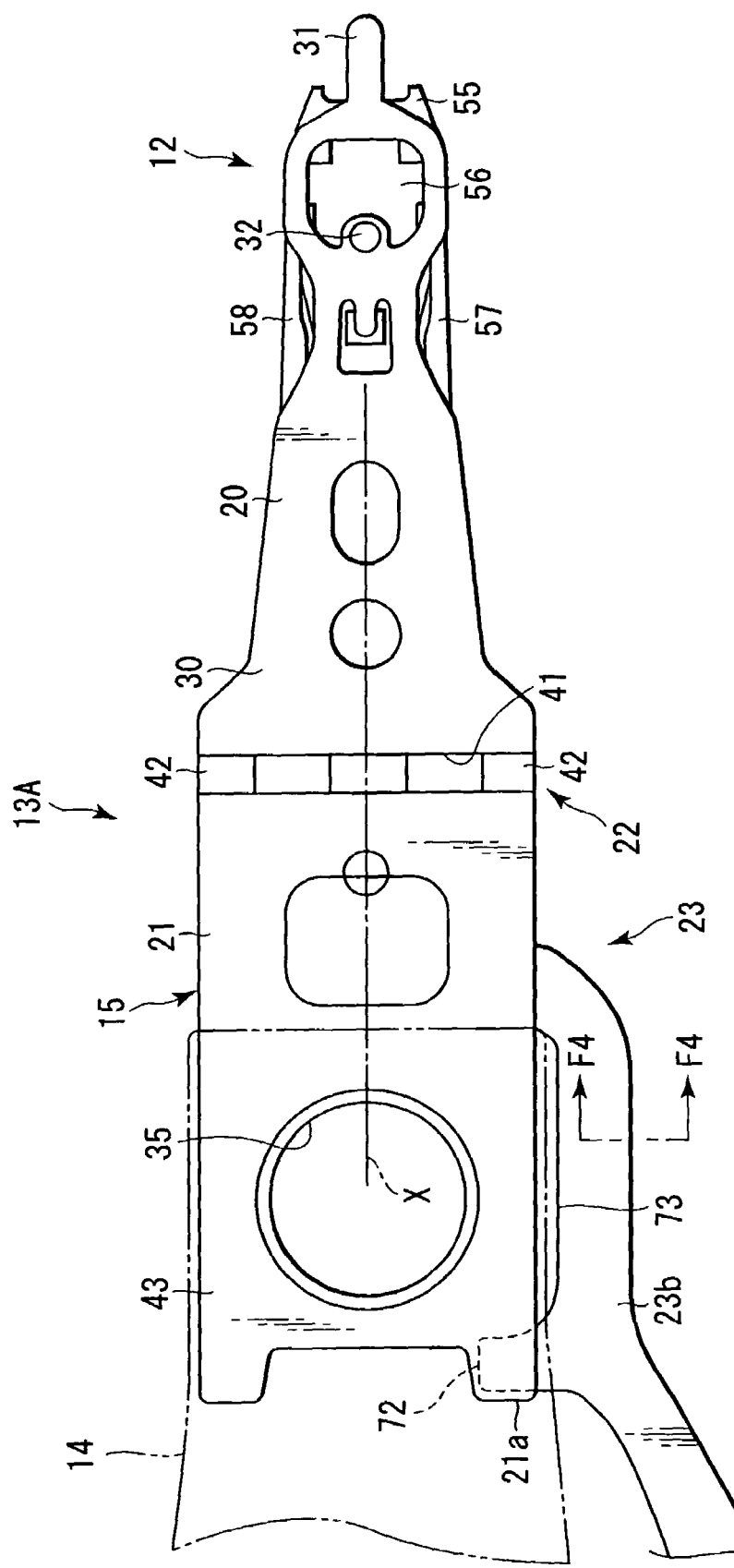
FIG. 2 is a bottom plan view of the disc drive suspension shown in FIG. 1.

As shown in FIGS. 1 and 2, each suspension 13A includes a load beam 20, a base section 15 including a baseplate 21, a hinge member 22, a wired flexure 23 mounted on the load beam 20, etc. The flexure 23 extends along the load beam 20.

The load beam 20 has a proximal portion 30 and a tip portion 31. A dimple 32 is formed near the tip portion 31. The load beam 20 is about 100 μm thick, for example, while the baseplate 21 is about 200 μm thick, for example.

A cylindrical boss portion 35 is formed on the baseplate 21. As shown in FIG. 3, the boss portion 35 is inserted into a mounting hole 36 of the arm 14. The baseplate 21 is fixed to the arm 14 by spreading (or plastically deforming) the boss portion 35 from inside.

The hinge member 22 has a pair of end portions 40 that are fixedly lapped on the proximal portion 30 of the load beam 20, a pair of hinge portions 42 capable of elastic deformation in the thickness direction, and a baseplate mounting portion 43 fixedly lapped on the baseplate 21. The hinge portions 42 are formed individually on the opposite sides of an opening 41. The baseplate 21 and a part (baseplate mounting portion 43) of the hinge member 22 constitute the base section 15.

Both the baseplate 21 and the hinge member 22, which is an example of a member lapped on the baseplate 21, have a bilateral weight balance with respect to an axis X (shown in FIG. 2) of the load beam 20. By way of example, they are substantially bisymmetrical with respect to the axis X. The respective shapes of the baseplate 21 and the hinge member 22 may be subject to some difference on either side of the axis X. In conclusion, the baseplate 21 and the hinge member 22 should only have shapes such that their respective weights on the opposite sides are substantially equal so that their bilateral moments of inertia are balanced as the load beam 20 is twisted around the axis X.

The wired flexure 23 includes a main portion 23a that extends along the load beam 20 and an extending portion 23b that extends behind the boss portion 35 along the baseplate 21. The extending portion 23b of the flexure 23 is equivalent to a wiring member according to the present invention.

The main portion 23a of the flexure 23 is fixed to a predetermined portion of the load beam 20 by laser welding or adhesive bonding. The extending portion 23b of the flexure 23 extends toward the baseplate 21 through the space between the left- and right-hand hinge portions 42.

Figure 4:
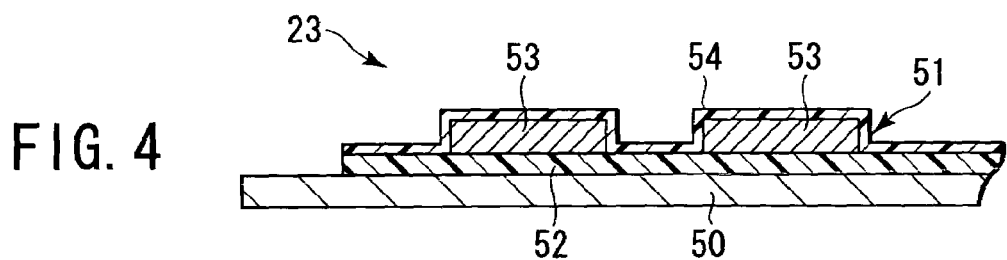
FIG. 4 is a sectional view of a part of a wired flexure taken along line F4—F4 of FIG. 2.

As shown in FIG. 4, the flexure 23 has a metal base 50 and a wiring portion 51 formed on the base 50. The metal base 50 is formed of a thin springy stainless-steel sheet having a thickness of about 18 μm to 30 μm, for example. The wiring portion 51 is composed of an electrical insulating layer 52 formed of a polyimide layer, for example, a plurality of conductors 53 on the layer 52, a covering layer 54, etc. The conductors 53 are composed of an electrically conductive material, such as copper.

A distal end portion 55 of the flexure 23 is formed having a tongue portion 56 that serves as a movable portion and outrigger portions 57 and 58 that are situated on the opposite sides, left and right, of the tongue portion 56. The tongue portion 56 and the outrigger portions 57 and 58 form a part of the metal base 50 and can bend in the thickness direction of the flexure 23. The tongue portion 56 engages the dimple 32 on the load beam 20.

A slider 59 that constitutes the head section is attached to the tongue portion 56. The slider 59 is provided with a transducer (not shown) for use as a magneto-electric transducer element. The transducer, slider 59, etc. constitutes the head section 12.

First and second supported portions 71 and 72 are formed individually on longitudinal parts of the extending portion 23b of the flexure 23. The supported portions 71 and 72 are formed by individually extending parts of the metal base 50 of the flexure 23 sideways. Since the metal base 50 is much thinner than the load beam 20 and the baseplate 21, the formation of the supported portions 71 and 72 adds to the weight only slightly.

The first supported portion 71 is situated ahead of the boss portion 35 or nearer to the head section 12. The second supported portion 72 is situated behind the boss portion 35 or remoter from the head section 12.

The first supported portion 71 is lapped and fixed on the hinge member 22 by fixing means, such as laser welding.

The second supported portion 72 is lapped and fixed on a rear end portion 21a of the baseplate 21 behind the boss portion 35 by fixing means, such as laser welding.

A slit 73 is formed between the first and second supported portions 71 and 72. The baseplate 21 and the wired flexure 23 are not fixed to each other in the area corresponding to the slit 73.

Thus, the wiring portion 51 is located beside the base section 15, and first supported portion 71 is fixed to the hinge member 22, and the second supported portion 72 is fixed to the rear end portion 21a of the baseplate 21.

In the present embodiment, the supported portion 72 is lapped and fixed on the rear end portion 21a of the baseplate 21 that is not overlapped by the hinge member 22. Since the metal base 50 that constitutes the supported portion 72 is thinner than the hinge member 22, the supported portion 72 is lower in height level than the hinge member 22 around the boss portion 35 when it is lapped on the rear end portion 21a of the baseplate 21. Thus, a jig that is lapped on the hinge member 22 in spreading the boss portion 35 can be prevented from interfering with the supported portion 72.

Since the wired flexure 23 passes through the space (middle portion with respect to the width direction) between the hinge portions 42, the shape of that part of each suspension 13A near the hinge portions 42 is substantially bisymmetrical. Besides, the supported portion 72, which is formed of the very thin metal base 50, is fixed to the rear end portion 21a of the baseplate 21. Thus, the extending portion 23b of the flexure 23 is supported on the rear end portion 21a of the baseplate 21. If the suspension 13A swings in the thickness direction, therefore, the load beam 20 and the baseplate 21 cannot easily induced to twist.

Figure 5:
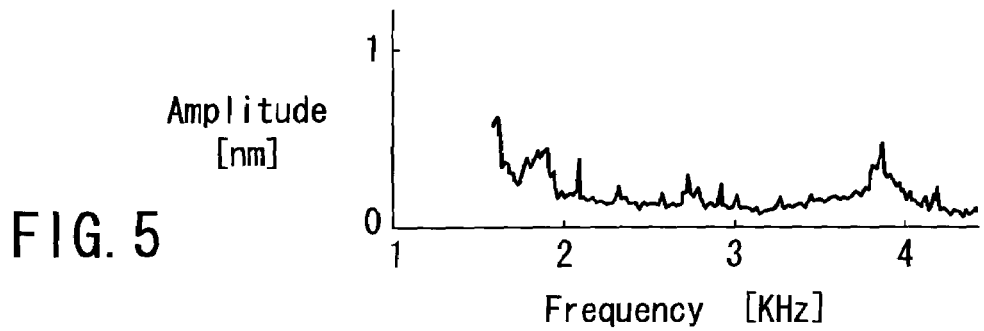
FIG. 5 is a diagram showing the oscillation characteristic of the disc drive suspension shown in FIG. 1.
Figure 11:
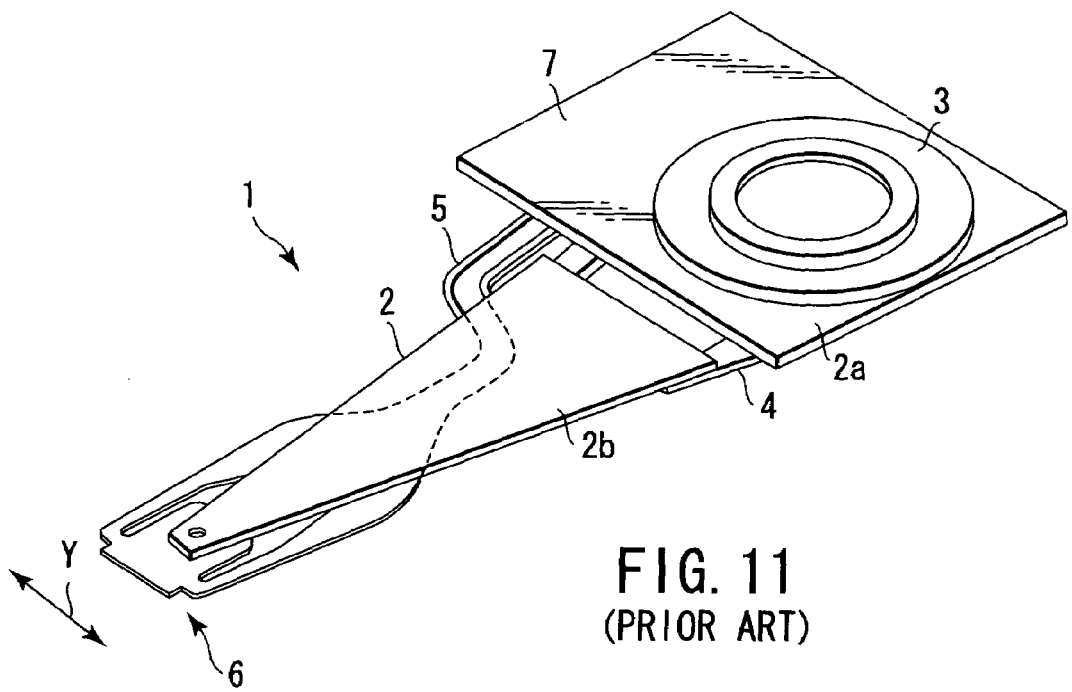
FIG. 11 is a perspective view showing a conventional disc drive suspension.
Figure 13:
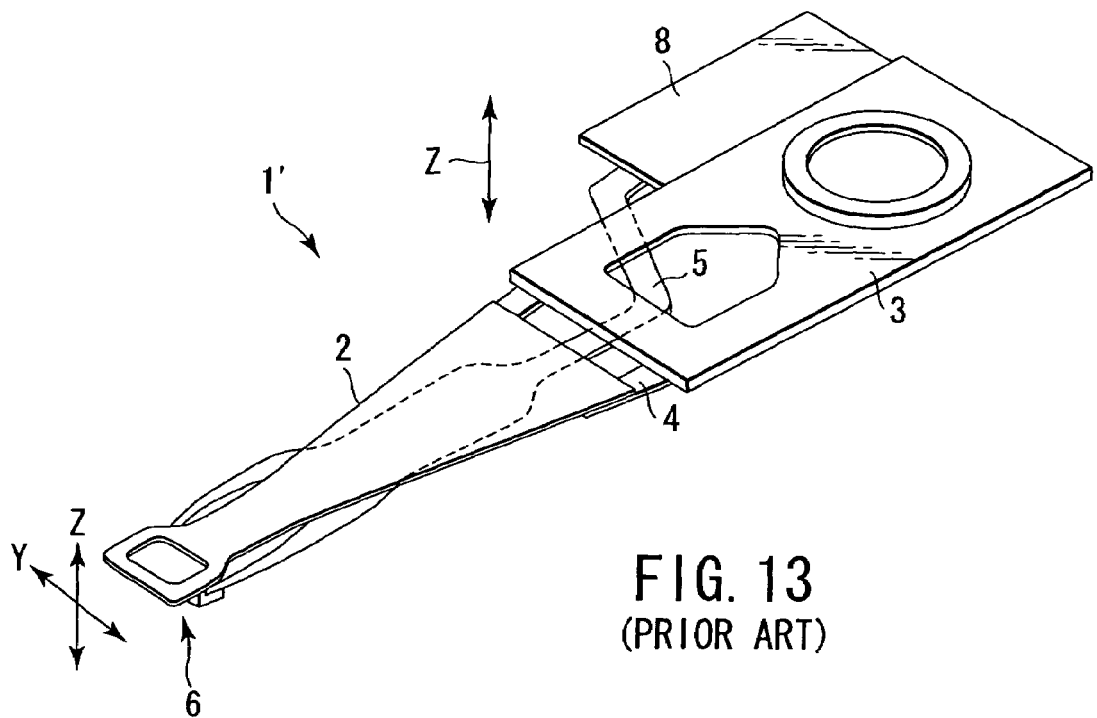
FIG. 13 is a perspective view showing another conventional disc drive suspension.
Figure 12:
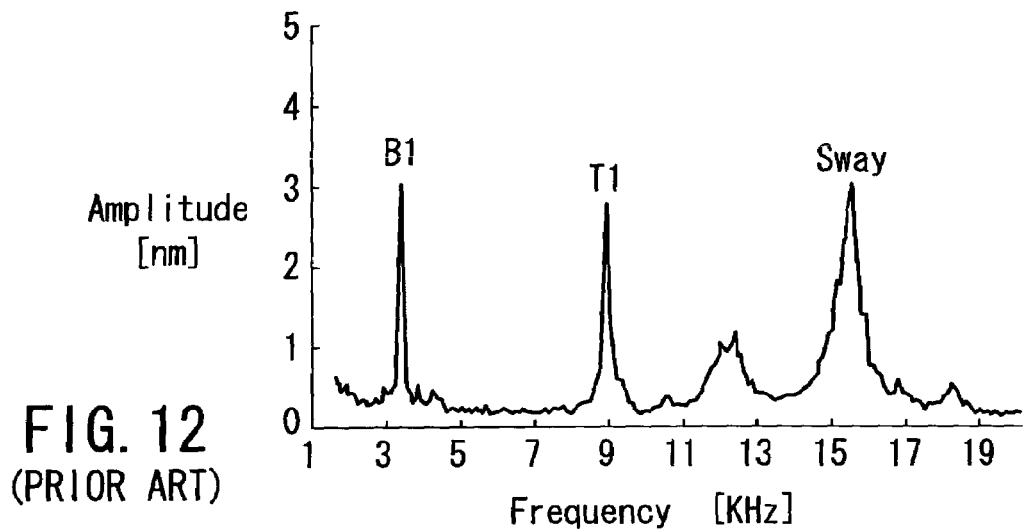
FIG. 12 is a diagram showing the oscillation characteristic of the disc drive suspension shown in FIG. 11.
Figure 14:
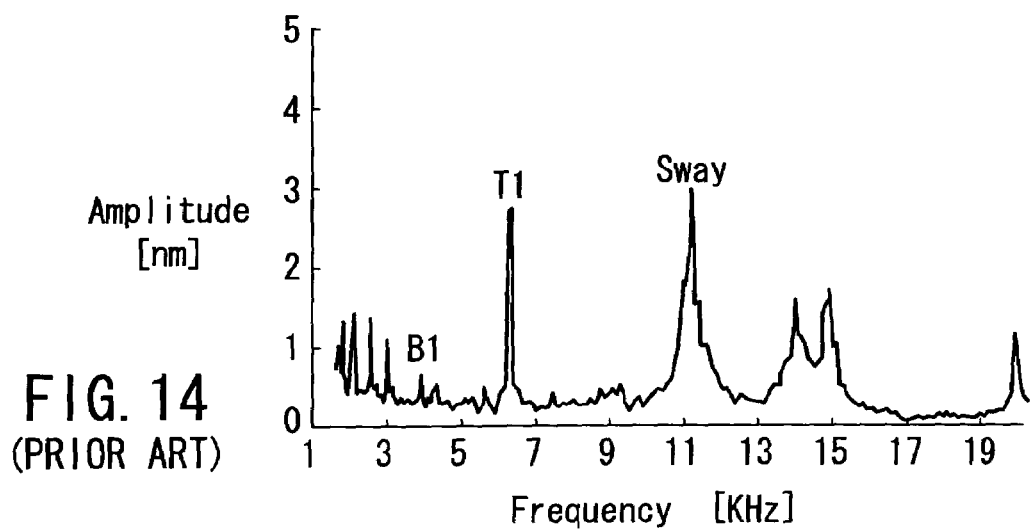
FIG. 14 is a diagram showing the oscillation characteristic of the disc drive suspension shown in FIG. 13.
Figure 15:
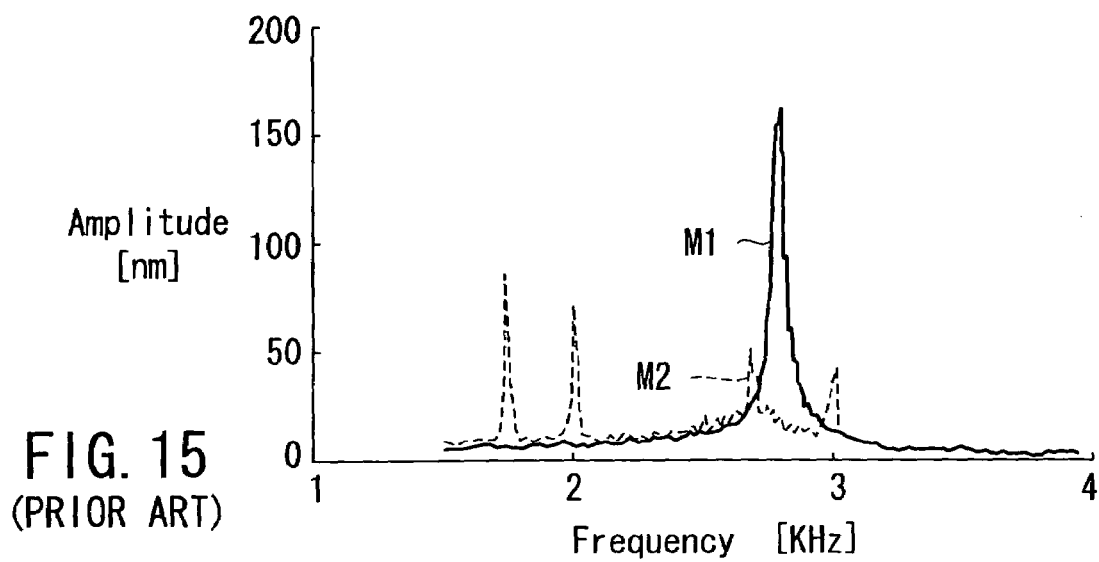
FIG. 15 is a diagram showing the respective Z-direction swings of a wiring supporting portion and a load beam of the disc drive suspension shown in FIG. 13.

FIG. 5 shows the swing of the suspension 13A in the track direction. The suspension 13A slightly swings in the frequency range near 3 to 4 kHz. When compared to the conventional suspensions (prior art examples shown in FIGS. 11 and 13), however, the suspension 13A is considerably improved in the track-direction swing performance.

Figure 6:
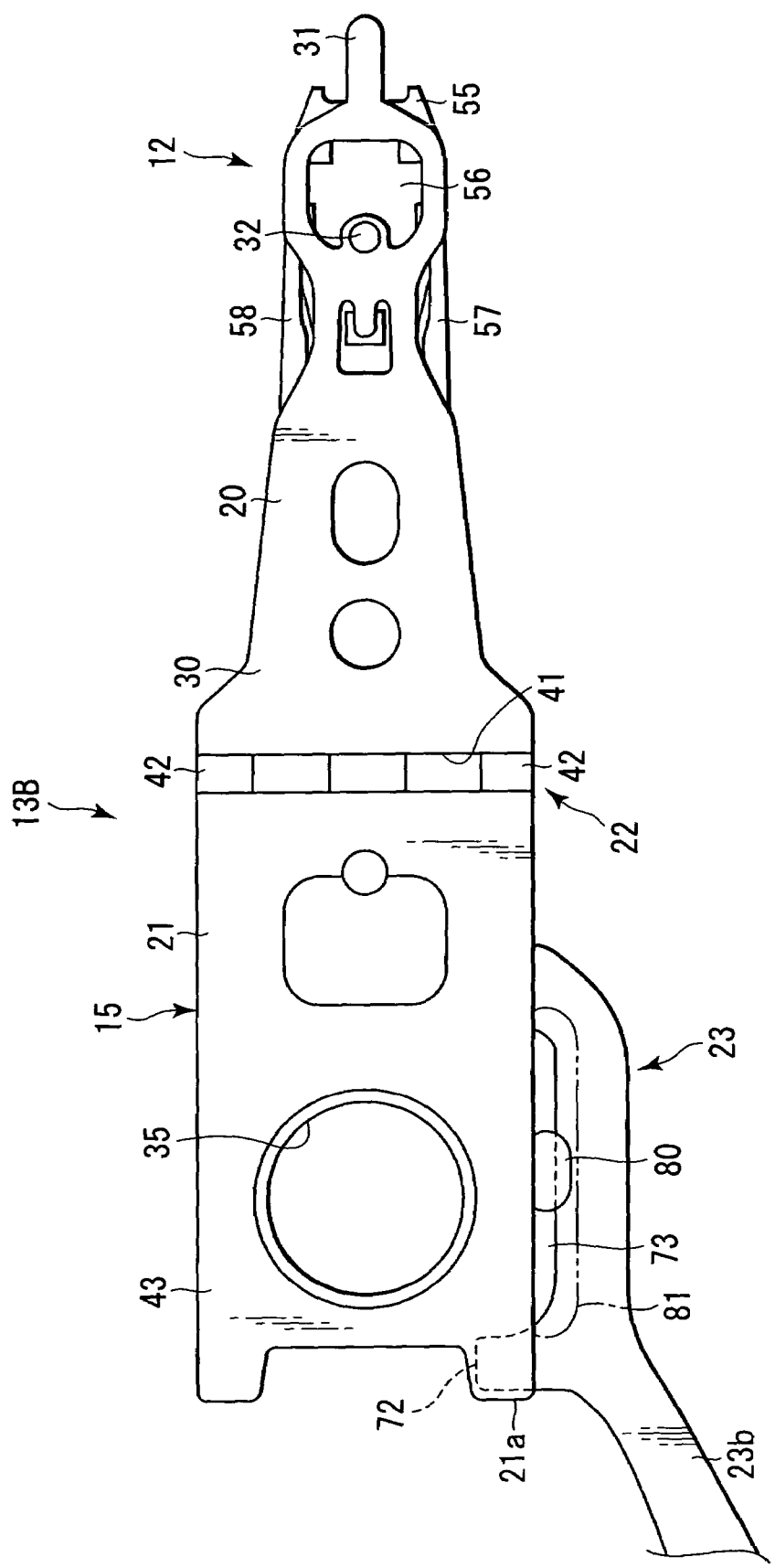
FIG. 6 is a plan view of a disc drive suspension according to a second embodiment of the invention.

FIG. 6 shows a disc drive suspension 13B according to a second embodiment of the invention. In this suspension 13B, an adhesive agent 80 is supplied to a part of a gap 73 between the flank of an extending portion 23b of a wired flexure 23 and the flank of a base section 15. When the adhesive agent 80 sets, the flank of a baseplate 21 and the flexure 23 are coupled together.

Figure 7:
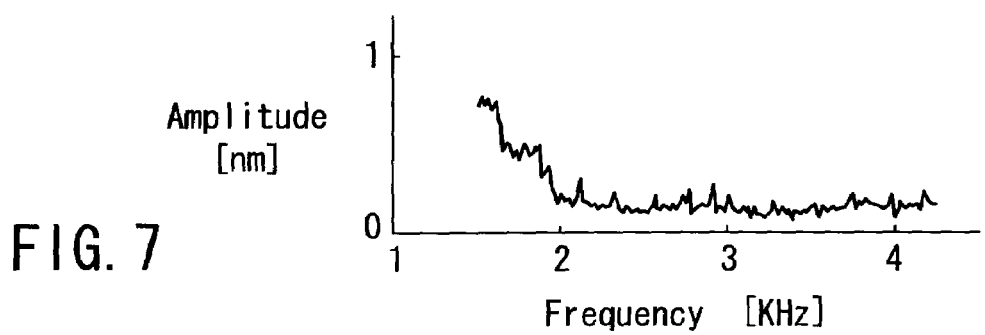
FIG. 7 is a diagram showing the oscillation characteristic of the disc drive suspension shown in FIG. 6.

FIG. 7 shows the swing of the suspension 13B of the second embodiment in the track direction. With use of this suspension 13B, there is no substantial swing within the range from 3 to 4 kHz. Thus, the track-direction swing in the low-frequency band cannot be amplified by a servomechanism. The suspension 13B shares other configurations and functions with the suspension 13A of the first embodiment. Therefore, like numerals are used to designate common portions of the two suspensions, and a description of those portions is omitted.

The track-direction swing can be further restrained by supplying the adhesive agent 80 to the gap 73 throughout its length, as indicated by a two-dot chain line 81 in FIG. 6.

Instead of using the adhesive agent 80, a part of the metal base 50 may be extended so that the resulting extending portion can be lapped and fixed on the baseplate 21 or a hinge member 22.

Figure 8:
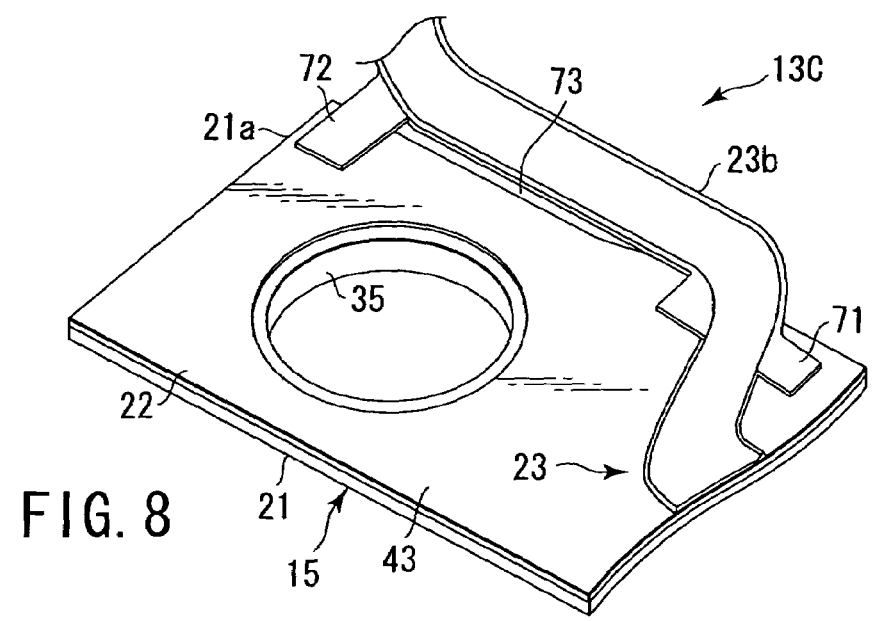
FIG. 8 is a perspective view of a part of a disc drive suspension according to a third embodiment of the invention.

FIG. 8 shows a part of a disc drive suspension 13C according to a third embodiment of the invention. In this suspension 13C, a supported portion 72 is fixed to a baseplate mounting portion 43 of a hinge member 22. The suspension 13C shares other configurations and functions with the suspension 13A of the first embodiment. Therefore, like numerals are used to designate common portions of the two suspensions, and a description of those portions is omitted.

Figure 9:
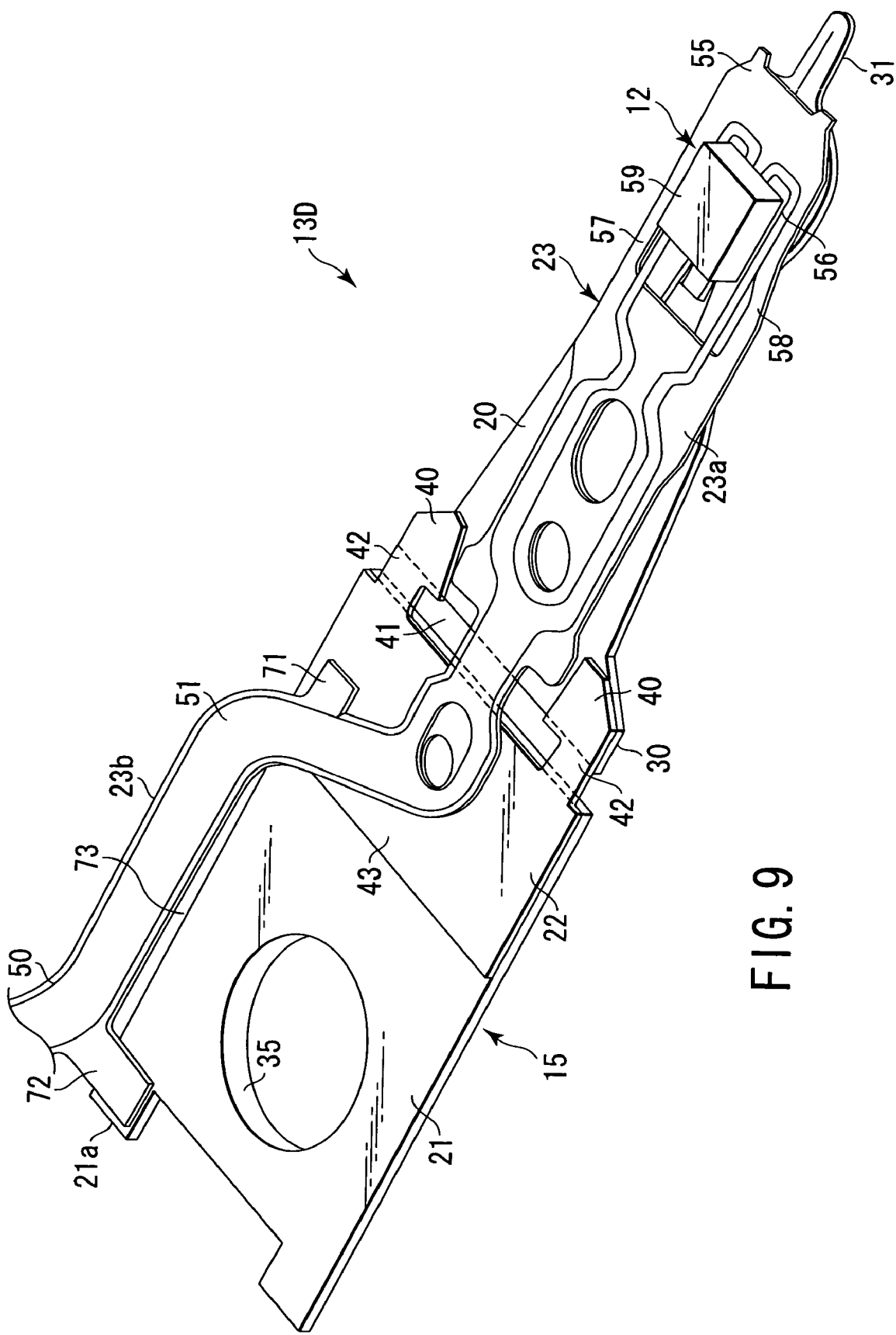
FIG. 9 is a perspective view of a disc drive suspension according to a fourth embodiment of the invention.

FIG. 9 shows a disc drive suspension 13D according to a fourth embodiment of the invention. Since a hinge member 22 of this suspension 13D is shorter than the hinge member 22 of the suspension 13A of the first embodiment, its weight is lessened correspondingly. The suspension 13D shares other configurations and functions with the suspension 13A of the first embodiment. Therefore, like numerals are used to designate common portions of the two suspensions, and a description of those portions is omitted.

Figure 10:
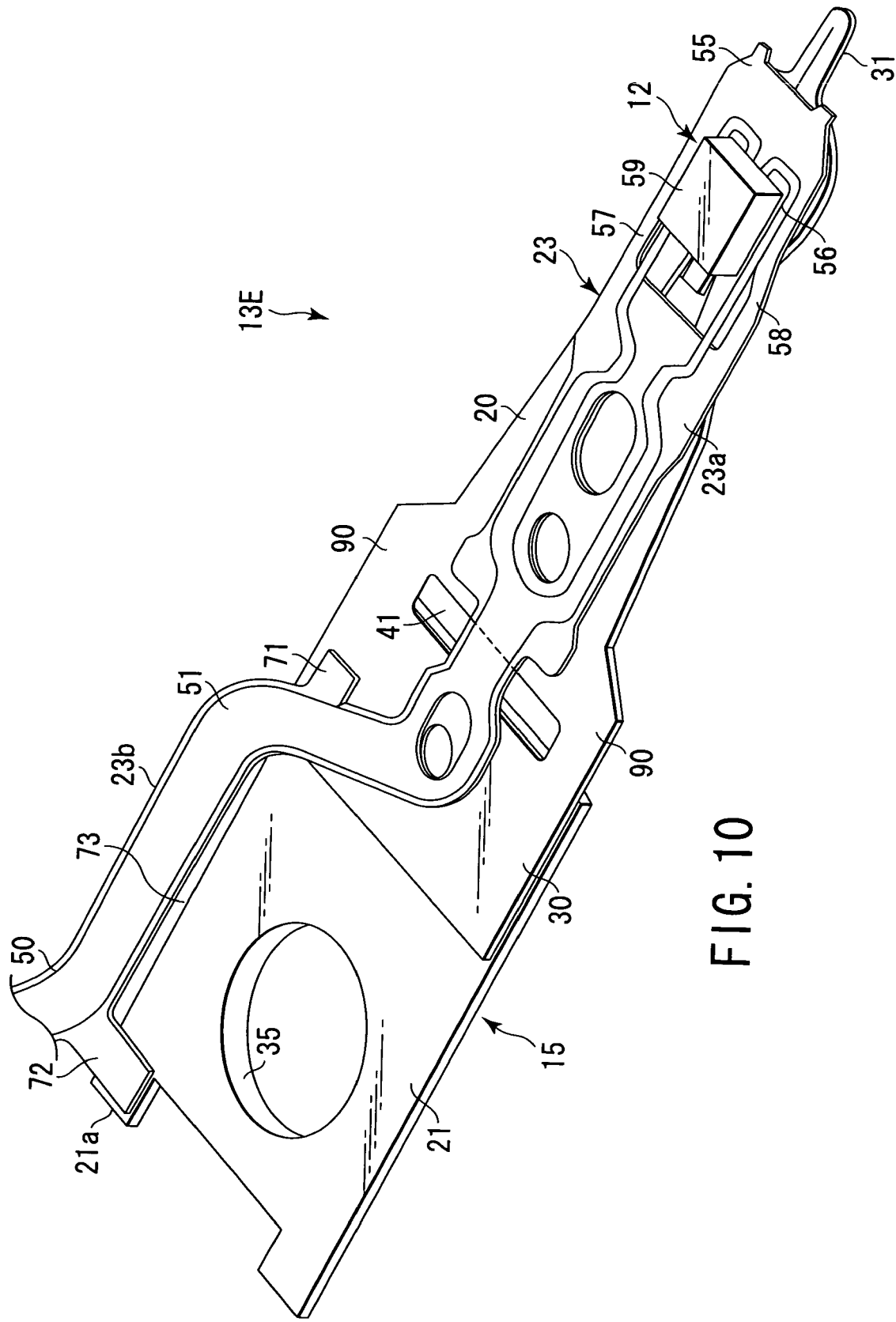
FIG. 10 is a perspective view of a disc drive suspension according to a fifth embodiment of the invention.

FIG. 10 shows a disc drive suspension 13E according to a fifth embodiment of the invention. In this suspension 13E, a hinge portion 90 that is elastically bendable in the thickness direction is formed near a proximal portion 30 of a load beam 20. The proximal portion 30 of the load beam 20 is fixed to a baseplate 21. The suspension 13E shares other configurations and functions with the suspension 13A of the first embodiment. Therefore, like numerals are used to designate common portions of the two suspensions, and a description of those portions is omitted.

It is to be understood, in carrying out the present invention based on these embodiments, that the components of the invention, including the respective forms of the load beam, baseplate, wiring member, supported portions, etc., may be changed or modified variously without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc drive suspension comprising:
a base section including a baseplate;
a load beam having a proximal portion and a tip portion;
a flexure which is lapped and fixed on the load beam and which has a head section on a distal end portion thereof; and
a wiring member extending along the base section;
wherein the base section is shaped such that a weight thereof is balanced bilaterally with respect to an axis of the load beam;
wherein a part of the wiring member is formed to have a supported portion protruding sideways therefrom, and the supported portion is fixed to the base section at a rear end portion of the baseplate.

2. A disc drive suspension according to claim 1, wherein the base section is bisymmetrical with respect to the axis of the load beam.

3. A disc drive suspension according to claim 1, wherein the wiring member comprises a wired flexure including a metal base and a wiring portion formed on the metal base, and said part of the wiring member comprises a part of the metal base.

4. A disc drive suspension according to claim 1, wherein an adhesive agent is provided in at least a part of a gap between respective flanks of the wiring member and the base section.

5. A disc drive suspension according to claim 1, further comprising a hinge member formed independently of the baseplate and the load beam;
wherein the hinge member connects the baseplate and the load beam and comprises a pair of hinge portions that are elastically deformable in a thickness direction thereof provided between the baseplate and the load beam, and the wiring member passes through the hinge portions.

6. A disc drive suspension according to claim 5, wherein the supported portion is thinner than the hinge member, and the rear end portion of the baseplate is not overlapped by the hinge member.

7. A disc drive suspension according to claim 1, wherein the load beam comprises a pair of hinge portions which are elastically deformable in a thickness direction thereof, and the wiring member passes through the hinge portions.

8. A disc drive suspension comprising:
a base section including a baseplate;
a load beam having a proximal portion and a tip portion;
a flexure which is lapped and fixed on the load beam and which has a head section on a distal end portion thereof; and
a wiring member which extends along the base section, and includes a metal base formed of a metal plate and a wiring portion formed on the metal base;
wherein a part of the metal base is formed to have a supported portion protruding toward and fixed to the base section, and a part of the wiring member is located beside the base section.

9. A disc drive suspension according to claim 8, wherein the supported portion is fixed to a rear end portion of the baseplate.

10. A disc drive suspension according to claim 8, wherein the wiring member comprises a wired flexure including the metal base and the wiring portion formed on the metal base.

11. A disc drive suspension according to claim 8, wherein an adhesive agent is provided in at least a part of a gap between respective flanks of the wiring member and the baseplate.

12. A disc drive suspension according to claim 8, further comprising a hinge member formed independently of the baseplate and the load beam;
wherein the hinge member connects the baseplate and the load beam and comprises a pair of hinge portions that are elastically deformable in a thickness direction thereof provided between the baseplate and the load beam, the wiring member passes through the hinge portions.

13. A disc drive suspension according to claim 12, wherein the supported portion is thinner than the hinge member, and the supported portion is fixed to an end portion of the baseplate which is not overlapped by the hinge member.

14. A disc drive suspension according to claim 8, wherein the load beam comprises a pair of hinge portions which are elastically deformable in a thickness direction thereof, and the wiring member passes through the hinge portions.

* * * * *